(12) United States Patent
Lau

(10) Patent No.: US 7,984,573 B2
(45) Date of Patent: Jul. 26, 2011

(54) COMBINATION DEVICE FOR SNOW THROWING, MOWING, SCARIFYING, SOIL BREAKING OR THE LIKE

(76) Inventor: Andrew Manson Lau, Spaichingen (DE)

( * ) Notice: Subject to any disclaimer, the term of this patent is extended or adjusted under 35 U.S.C. 154(b) by 4 days.

(21) Appl. No.: 12/447,545

(22) PCT Filed: Nov. 7, 2007

(86) PCT No.: PCT/EP2007/009616
§ 371 (c)(1),
(2), (4) Date: Apr. 28, 2009

(87) PCT Pub. No.: WO2008/055660
PCT Pub. Date: May 15, 2008

(65) Prior Publication Data
US 2010/0064556 A1 Mar. 18, 2010

(30) Foreign Application Priority Data
Nov. 7, 2006 (DE) .................... 20 2006 016 981 U

(51) Int. Cl.
*A01G 1/12* (2006.01)
(52) U.S. Cl. ........................................................ 37/242
(58) Field of Classification Search .............. 37/242, 37/219, 227, 244, 241; 172/41–43, 60, 112, 172/125, 133, 253; 180/6.2, 6.24; 56/16.7, 56/16.9, 10.5, 11.3
See application file for complete search history.

(56) References Cited

U.S. PATENT DOCUMENTS

| | | | | |
|---|---|---|---|---|
| 3,603,162 | A | * | 9/1971 | Gohler ........................... 74/16 |
| 3,758,967 | A | * | 9/1973 | Thompson .................... 37/242 |
| 3,777,460 | A | * | 12/1973 | Mokros ........................ 56/16.7 |
| 4,064,679 | A | | 12/1977 | Spinner |
| 4,620,599 | A | * | 11/1986 | Zinck .............................. 172/42 |
| 5,410,824 | A | * | 5/1995 | Pedersen ....................... 37/242 |
| 5,410,825 | A | | 5/1995 | Perrelli |
| 5,520,253 | A | * | 5/1996 | Kesting ........................ 172/125 |
| 6,643,959 | B2 | * | 11/2003 | Jolliff et al. .................... 37/244 |
| 7,137,214 | B2 | * | 11/2006 | Hoerle et al. .................. 37/242 |
| 2002/0020083 | A1 | | 2/2002 | White, III et al. |
| 2006/0096136 | A1 | | 5/2006 | Shaffer et al. |

FOREIGN PATENT DOCUMENTS
DE 2 017 981 10/1971
DE 31 00 904 8/1982
DE 38 12 105 9/1988

* cited by examiner

*Primary Examiner* — Robert E Pezzuto
(74) *Attorney, Agent, or Firm* — McGlew and Tuttle, P.C.

(57) ABSTRACT

A combination device (1) is provided for carrying out various work tasks, such as cutting snow, mowing, scarifying, soil breaking or the like. The device includes a plurality of interchangeable work implements (60) tailored to the respective work task. A basic frame is provided in which the respective work implement (60) is accommodated and can be driven to rotate, and wherein the respectively installed work implement (60) is partially enclosed by a housing (23) extending parallel to the axis of rotation of the work implement. In order to tailor the combination device optimally to the respective work task, provision is made for the housing (23) to be able to rotate about an axis parallel to the axis of rotation of the respective work implement (60) and to be fastened in various operating positions corresponding to the respective work task.

12 Claims, 8 Drawing Sheets

COMBINATION DEVICE FOR SNOW THROWING, MOWING, SCARIFYING, SOIL BREAKING OR THE LIKE

CROSS REFERENCE TO RELATED APPLICATIONS

This application is a United States National Phase application of International Application PCT/EP2007/009616 and claims the benefit of priority under 35 U.S.C. §119 of German Patent Application DE 20 2006 016 981.4 filed Nov. 7, 2006, the entire contents of which are incorporated herein by reference.

FIELD OF THE INVENTION

The present invention relates to a combination device for performing different tasks such as snow throwing, mowing, scarifying, soil breaking, sweeping or the like by means of interchanging the work implements such that each implement is adapted for each respective task, whereby a machine frame is intended for taking on the respective work implement and letting it be driven in rotation, and that the respectively installed work implement is enclosed by a partially open cylindrical housing the rotational axis of which lies in parallel to that of the work implement.

BACKGROUND OF THE INVENTION

Combination devices of such nature have been known in various guises in the past:

DE 2 017 981 A discloses one such combination snow thrower consisting of a basic machine. On such machine, various work implements can be interchanged by pulling out the axle pin. Work implements in cylindrical form can be used for tasks like salt sprinkling, snow clearing, ice and earth breaking, as well as lawn mowing and sweeping. Such cylindrical work implements can be rotated about an axis horizontal and parallel to the ground by means of a motor on board the machine.

In order to throw snow, a cylindrically shaped snow throwing drum with transverse shoveling paddles as described in DE 2 017 981 A is used. Ice breaking is another feature of the device which can be realized by replacing the snow throwing drum with a steel spiky one. For sweeping of powdery snow, garden debris or the like, a sweeping drum can be deployed with steel or plastic bristles. For soil breaking, a tilling drum is used, whereby it is combined with paddle wheels that are covered and together with which the dug up soil will be blown to the side. For lawn mowing, a cutting reel is used whereby the grass clippings are blown forward by the paddle wheels (fan) into a container. The cutting reel takes the form of two cutting knives with two sweeping brushes located at the back and which are intended for sweeping grass cuttings into the fan.

Another feature of the device in DE 2 017 981 A has a spreader that can be additionally attached to it for the purpose of sprinkling salt as well as soil fertilizer. Such combination device is penalized by the fact that not all its functionalities can be optimally designed for all the work tasks. In particular, in the case of snow throwing, a discharge chute is not provided for displacing snow at a further distance away during or at the end of the snow cutting process.

DE 31 00 904 C2 refers to another embodiment of a motorized walk-behind machine for snow clearing, sweeping or scarifying. This machine shows a basic housing into which various work implements, as described already in DE 2 017 981 A, can be accommodated.

According to DE 31 00 904 C2, additional side wheels can be mounted onto the housing such that the machine can be used as a scarifier. The side wheels however have to be mounted separately. Another disadvantage lies in the drive axis which, depending on the functionality, is supported from one side only, thereby leading to instability. In order to utilize the device as a sweeping machine or a snow thrower, the fixed housing and machine together are rotated about the work implement axis, thereby being brought into two distinctly different inclinations relative to ground. Furthermore, the device may for example be hampered by its inability to allow for height adjustment or the separation between the work implement and ground. The device is generally penalized in terms of its handling.

DE 38 12 105 C2 proposes a combination device for garden and roads. The embodiment includes a housing that is forwardly half open and which caters for different work implements. The work implements in turn are housed within their own casings both of which can be mounted and fixed onto the main device housing. Work implements for lawn mowing, scarifying, throwing snow, sweeping and blowing have also been mentioned.

According to DE 38 12 105 C2 and the claims therein, the work implements with their respective housings can be shifted sideways and subsequently locked into position within the device housing. In operation, the axis of the work implement is mechanically coupled to the device's own actuator by means of a pinion. The device is extremely troublesome to set up and requires individual housing for each work implement to be attached onto the main device housing.

The combination device as referred to in U.S. Pat. No. 4,064,679 A shows yet another embodiment that can be adapted for lawn mowing, snow throwing and lawn sweeping. Due to the inter-changeability of individual work implements, the device is also capable of multiple tasking. However, the changing of work implements is complicated by the housing, whose side wall has to be physically dismounted first, by undoing a number of bolts, before finally being able to change over the work implements. Additional housing covers or housing attachments are included for the different functionalities, which further complicate the tool setup not to mention the provision for additional storage of individual parts.

SUMMARY OF THE INVENTION

The deficiency just described is overcome in accordance with the present invention wherein the changing of different work implements is simplified and functionally optimized.

The work task is fulfilled by a combination including interchangeable work implements which adapt to the tasks in the respective operating configurations, a base frame onto which the respective work implements can be mounted and driven in rotation and whereby the individually built in work implement is partially enclosed by a housing that runs parallel to the rotation axis of the work implement. The housing is rotatable about an axis parallel to the drive axis of and can be locked into its respective position depending on the work task at hand.

Tool changing is hence made much easier through the rotatable housing of the combination device. Furthermore, tool changing is facilitated by having the housing only partially enveloping the work implement thereby permitting the necessary access. On the other hand, the housing can be brought to different positions, such that individual work tasks are optimally performed within the necessary work implement enclosure.

In the preferred embodiment, the housing encloses the work implement over a wrap angle such that the housing opens itself relatively forward and downward in the first operating position, mostly downward in the second operating position, and relatively backward and downward in the third operating position. Through such arrangement, snow throwing for example can be optimally performed when the housing is fixed with its opening facing the front and pointing downward. Lawn mowing for example can equally and optimally be performed by having the housing face downward and backward.

According to other features, the housing is equipped with rollers, wheels or rolling cylinders along its front and back edges that run parallel to the axis of work implement's rotation in such a way that the housing is supported off the ground by its back set of rollers, wheels or rolling cylinder when in the first operating position, the housing is not supported by any rollers, wheels or rolling cylinder when in the second operating position, the housing is supported off the ground by its front set of rollers, wheels or rolling cylinder when in the third operating position.

In the case of snow throwing, instead of rollers, wheels or rolling cylinder, the housing can also be supported by conventional skids which is height adjustable. The possibility for height adjustment also applies to the rollers, wheels or rolling cylinder.

The housing may be fitted with a scraper bar along its back edge in order to take up snow while the device is being used as a snow blower, and that the housing exhibits an opening in its first operating position on top of which a discharge chute can be attached. Through this configuration, the housing is best optimized for snow throwing. Through the rollers, wheels or rolling cylinder, the height of the scraper bar can be adjusted relative to ground in such a way that the combination device can best adapt to the respective working conditions.

The housing comprises two side walls that can be mounted in relative rotation to the two side plates of the basic frame, and that in the first side plate, provision is made for the transmission axle, and that in the second side plate, an axle journal is available, such that the inter-changeability and the rotation of different work implements and their adjustability can be catered for. Through this configuration, the work implements can be changed over easily and secured within a cost-effectively and simply designed housing.

The transmission axle is belt driven and that the respective work implements are coupled in rotation to and detachable from the transmission axle. Such form of transmission is especially easy to maintain.

The base frame may form an integral part of the basic machine, and the basic machine exhibits means of transport in the form of wheels, with which the basic machine together with the base frame and the respective work implement can be driven on the ground. The basic machine may have wheels which are height adjustable. The wheels can be free running such that the combination device can simply be pushed along by hand. To lighten the work load, the same wheels can be motorized and whose coupling can be switched on or off.

A motor actuator may be provided to drive the work implements via a pulley belt or the like. This motor actuator can also be used for driving the wheels via a switchable gear set.

The configuration of the different interchangeable work implements, especially in relation to snow throwing, mowing, scarifying, soil breaking or sweeping are also described. It is to be understood that the invention is not limited in its application to the details of construction and the arrangement of components as set forth.

As far as a self-contained walk-behind combination device is concerned, the wheels can also be driven by the on board motor actuator, as in the examples of snow throwing or lawn mowing, and the actuator in turn can also be switched on or off at will.

The combination device can also be so configured that it can be built onto a communal care vehicle, a tractor or the like in the form of an attachment. Here also, it can be seen that the rotatable housing will facilitate the changing over of work implements as well as its optimal operation.

All the work implements have in common a cylindrical form and that their axis of rotation is relatively parallel to the ground being worked on and runs across the direction of machine travel.

The invention in its preferred embodiment will now be described and become more readily apparent on examination of the following description, including the appended drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
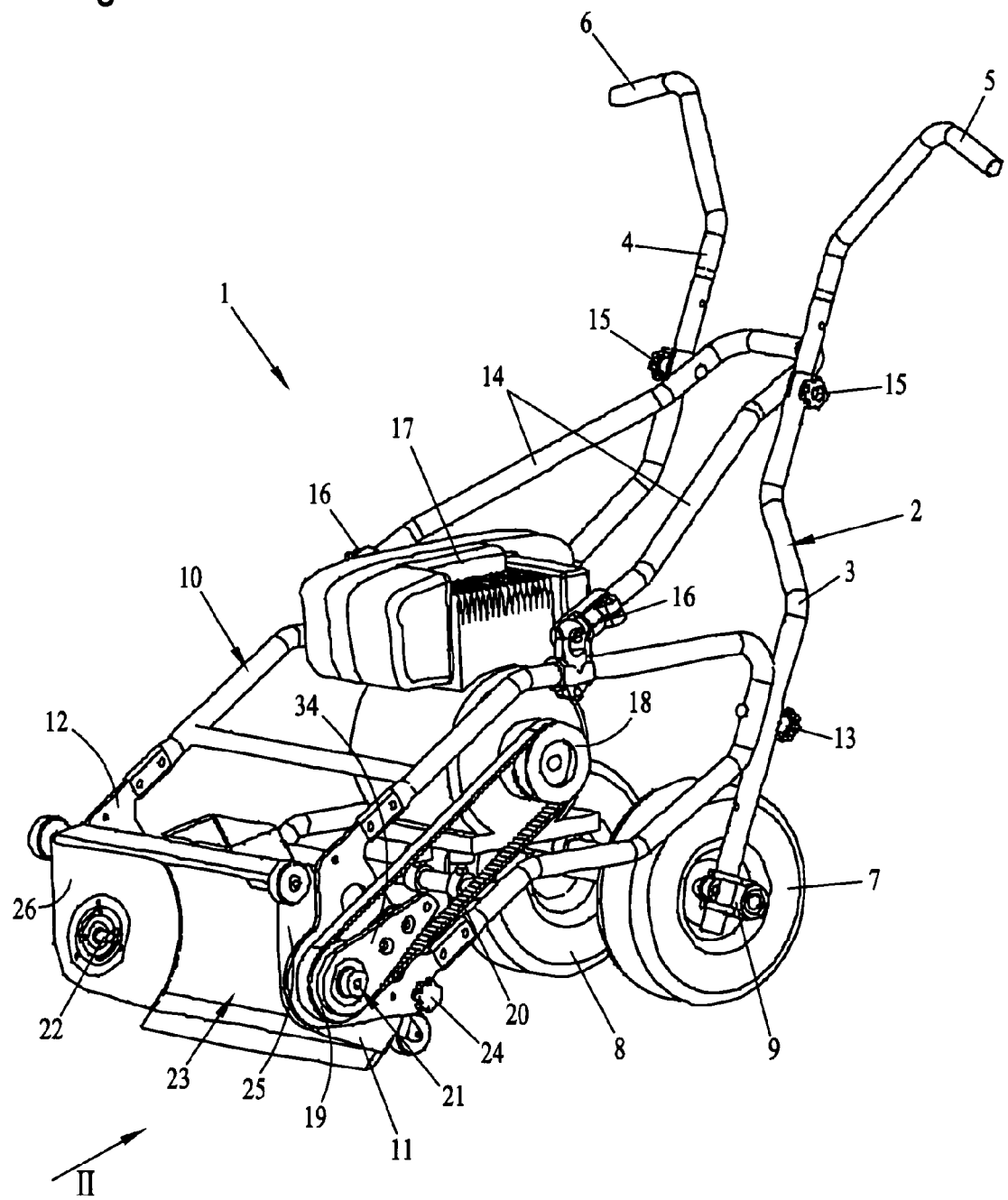
FIG. 1 is a perspective view of the invention, namely the combination device with a rotatable housing excluding the work implement.

Referring to the drawings in particular, FIG. 1 shows the principal configuration of a combination device 1 in its perspective view.

To the rear of the combination device 1, a wheel frame 2 is shown and which comprises two bent guide rods 3 and 4, whose upper ends transform into the respective hand grips 5 and 6. At the lower end of the guide rods 3 and 4, two wheels 7 and 8 are mounted by means of fixture 9 which enables height adjustment along the guide rods 3 and 4.

Furthermore, the combination device exhibits a base frame 10, whose front end is mounted with two vertical side plates 11 and 12. The side plates 11 and 12 are fixed onto but detachable from the base frame 10. The base frame 10 is bolted together with the lower parts of the guide rods 3 and 4 by means of the palm grip 13.

In order to support and strengthen the combination device 1, a stiffening bracket 14 is seen in the present embodiment with one end being attached to the guide rods 3 and 4 by means of the palm grip 15, while the other end being attached onto the base frame 10 by means of fixtures 16. Furthermore, a motor engine 17 can be seen in the present embodiment mounted onto the base frame 10, and whose very outer end is mounted with a belt pulley 18.

The belt pulley 18 is connected to another belt pulley 19 via a pulley belt 20. This pulley 19 serves the purpose of driving the transmission axle 21, the detailed function of which will be described later.

Lying coaxially to the transmission axle 21, a gudgeoning pin 22 is seen to the right side of the "rear" side plate 12, and which forms a straight line with the transmission axle 21. This gudgeoning pin 22 as well as the transmission axle 21 can be axially and outwardly retracted in order to allow for the easy changing over of work implements.

It is worth noting here that the basic design of the combination device 1 is capable of other embodiments. Important being the two side plates 11 and 12 with a housing 23 sitting in between. The housing 23 can be swung or pivoted about the transmission axle 21 as well as the journal 22 on both side plates 11 and 12, which is shown in the first operating position in FIG. 1. In the same operating position, it can be seen that the housing 23 is bolted down by means of two security bolts 24 one of which can be seen in FIG. 1.

It can also be seen in FIG. 1 that the housing 23 is shown with two side walls 25 and 26 that enable the housing to be mounted about a rotational axis parallel to the transmission axle 21 and to the gudgeoning pin 22.

Further details on the housing 23 will be explained later with reference to FIG. 4.

Figure 2:
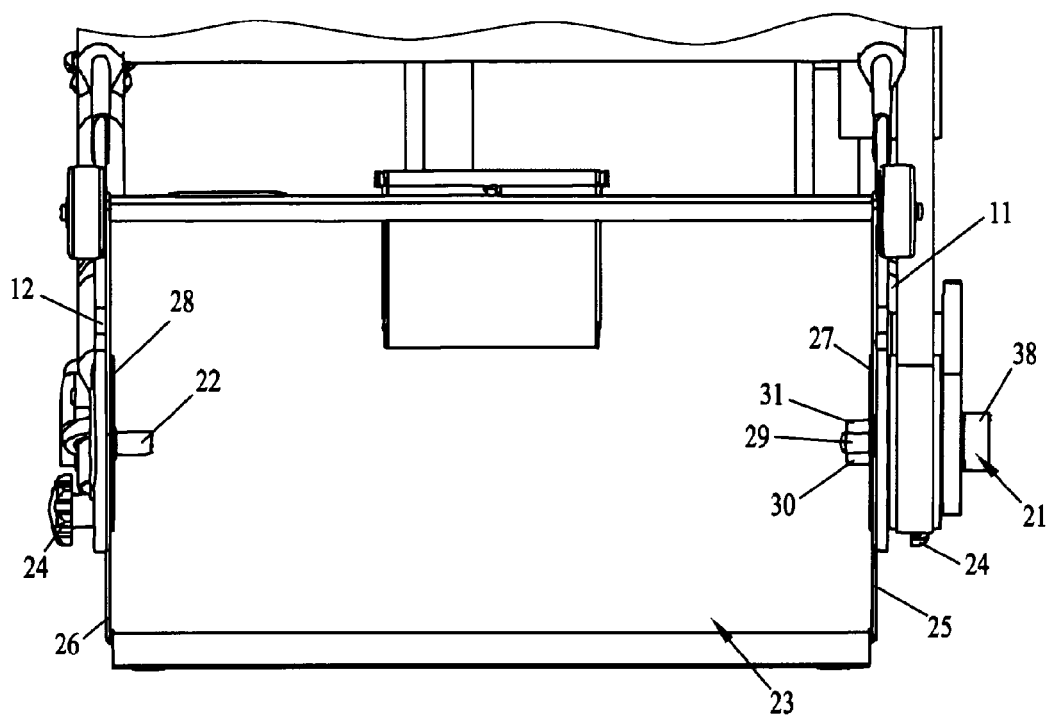
FIG. 2 is a front view II of the combination device housing as referred to in FIG. 1.

FIG. 2 shows the front view II, in particular, that of the housing 23 as in FIG. 1. It is noticeable that the housing 23 with its side walls 25 and 26 is fitted in between the two side plates 11 and 12. These assembly side plates 11 and 12 have on their inner sides clamp rings 27 and 28 that couple the housing 23 with its side walls 25 and 26 and enable them to rotate. The second security bolt 24 can also be seen in FIG. 2.

It can be further seen that the gudgeoning pin 22 projects into the housing 23. The transmission axle 21 also displays a drive element 29 that partially projects into the housing 23. The drive element 29 shows two diametrically opposite and radial projecting drive keys 30 and 31, via which the transmission axle 21 can be rotationally coupled onto the respective work implement within the housing 23.

Figure 3:
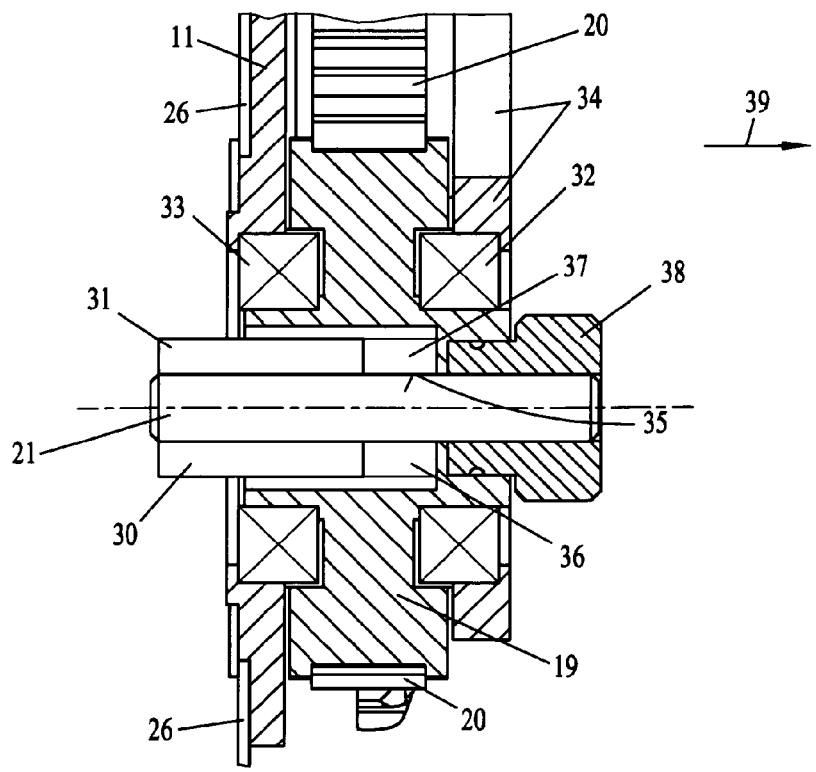
FIG. 3 is a cross-sectional view through the bearing fixture of the drive axis within the housing as referred to in FIG. 2.

FIG. 3 shows an enlarged view of the transmission axle 21 in the area of the assembly side plate 11. It can be seen that the drive pulley 19 is rotationally mounted with bearings 32 and 33 along the axle on either of its extreme end. The bearing 33 is seated respectively on the assembly side plate 11. A support plate 34 outside at a distance away from and fixed onto the assembly plate 11 is as shown in FIG. 1. The drive pulley 19 is drilled with a hole 35 in the center the inner side of which is cut with two diametrically opposite key slots 36 and 37. In this key slot, the two drive keys 30 and 31 of the transmission axle 21 can be form fittingly taken up and remain axially adjustable. From the engaging position as shown in FIG. 3, the transmission axle can be seen axially adjustable in the direction as indicated by the arrow 39 by means such as spring actuation (not shown here) and alike, to such extent that a work implement can be inserted in between the side walls 25 and 26 of the housing 23.

The fixation for the gudgeoning pin 22 is also designed in a similar fashion. In FIG. 3, the tooth belt 20 can also be seen.

As already mentioned previously, FIG. 4 shows the housing 23 in perspective view. This view of the housing 23 is already presented as the first operating configuration in FIG. 1. The housing 23 comprises a partially open cylindrical outer wall 40, which is fitted or for example welded with the side walls 25 and 26. To the front of the outer wall 40, there is a reinforcement fixture 41 formed on top and the front end within which is seen with a bearing shaft 42. The bearing shaft projects out of the two side walls 25 and 26 such that on either side the wheels 43 and 44 are supported accordingly.

To the back and at the bottom of the outer wall 26, a lug plate 45/1 is shown here together with a second lug plate not displayed in the drawing, the purpose of which is to provide support for the back wheels 45.

Figure 4:
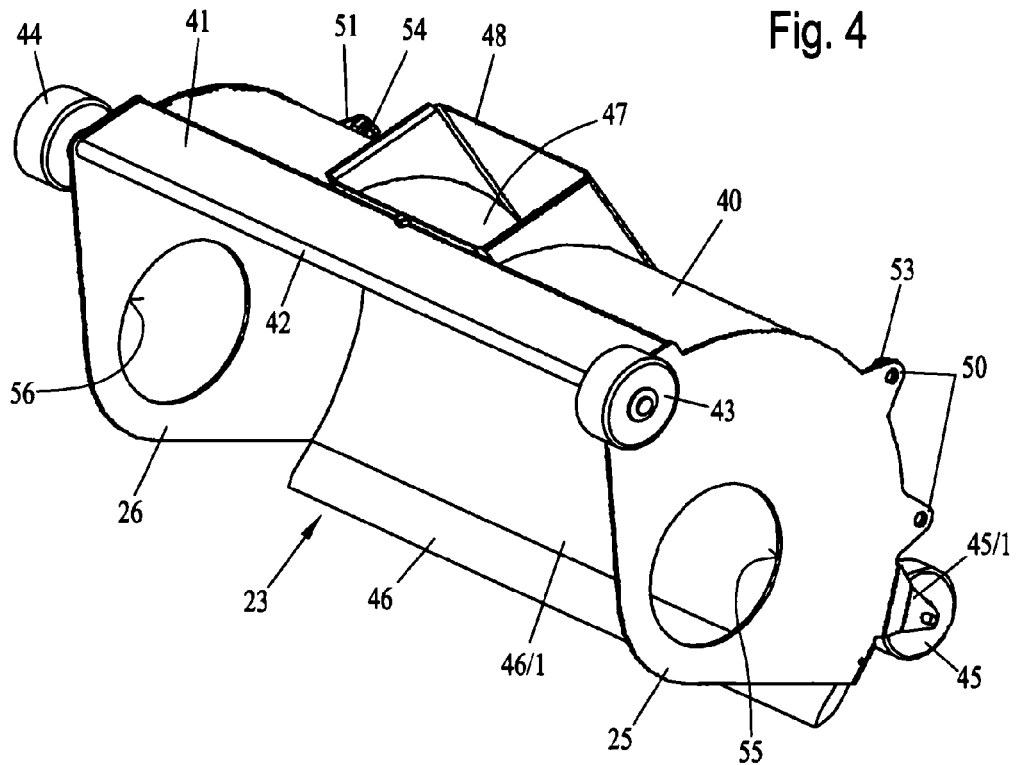
FIG. 4 is a perspective view of the combination device as referred to in FIG. 1.

Furthermore, it can be seen in FIG. 4 that in the rear edge 46/1 location of the housing 23, a scraper 46 is provided whose function corresponds to that of a snow thrower.

On the top of the outer wall 40, an opening 47 can be further seen in the vicinity of which a chute adapter 48 is fitted. The chute adapter 48 serves as a removable mounting platform for the blowing chute 49, as shown in FIG. 6 that can be typically found in the state-of-the-art snow thrower.

On both the side walls 25 and 26, locking fixtures 50 and 51 can be seen projecting radially with the purpose of fixing the housing 23 in between the assembly side plates 11 and 12 in the respective operating configuration. In the corresponding configuration, fixation holes 52 can also be seen on the assembly side plate 11 and 12, as shown in FIG. 6. The second fixation hole in the lower region of the side wall 11 is seen here hidden by the security bolt 24, which projects and typically locks through the lower fixture hole 50 on the side wall 25 of the housing 23. The fixing of the security bolts 24 can be realized by means of bolt nuts 53 and 54 welded onto the locking holes 50 and 51.

It can be seen further in FIG. 4 that both side walls 25 and 26 have round apertures 55 and 56, upon which the respective assembly side plates 11 and 12 can be rotationally located, as shown in FIG. 2.

Figure 5:
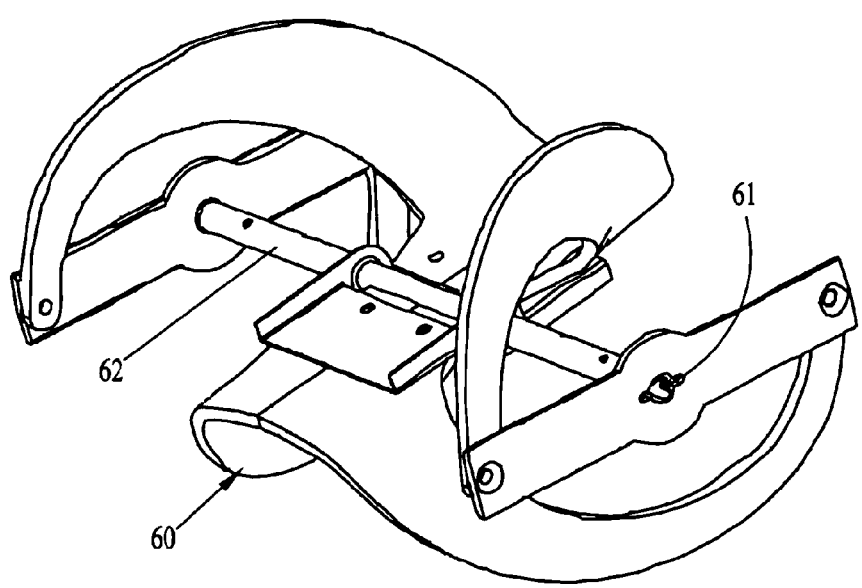
FIG. 5 is a perspective view of one work implement in the form of an augur for use with the combination device as a snow thrower.
Figure 6:
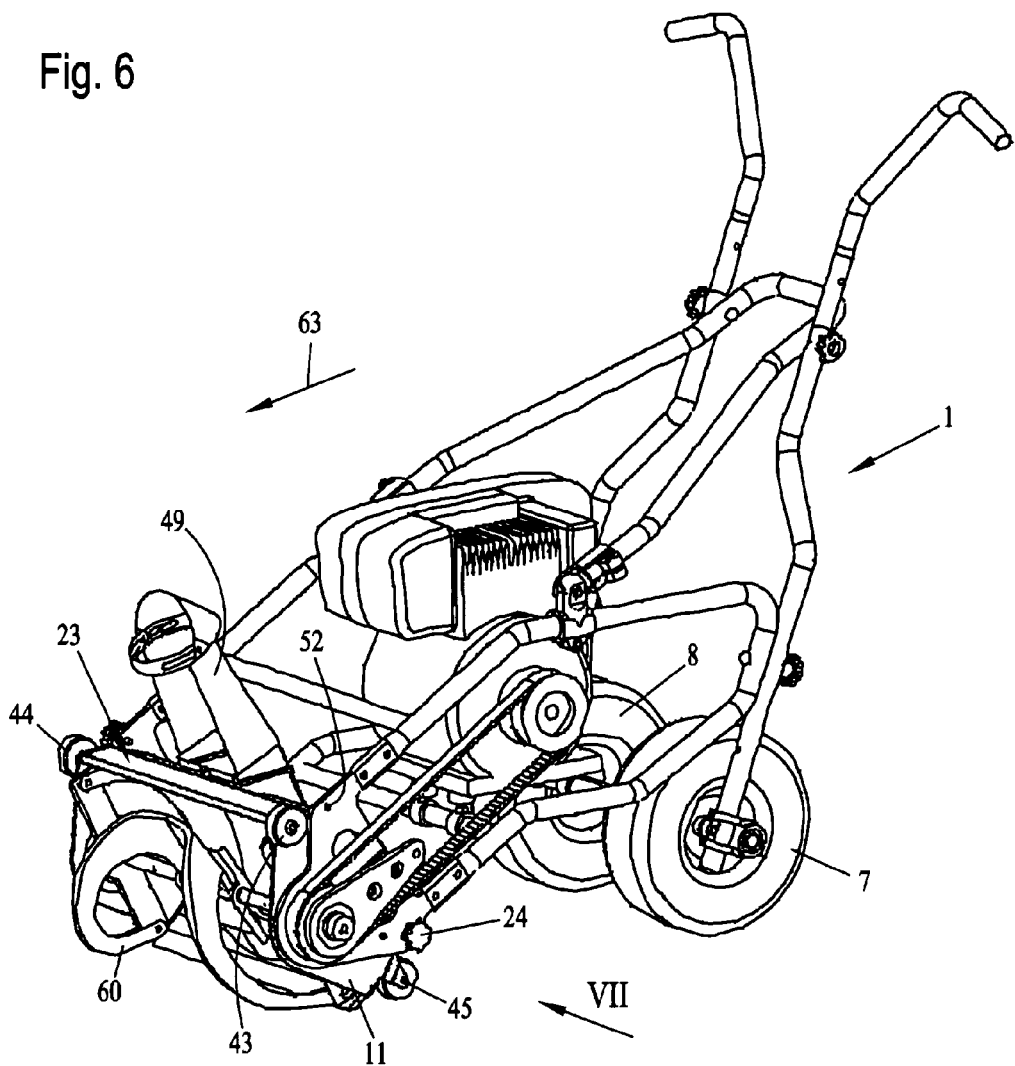
FIG. 6 a perspective view of the combination device as referred to in FIG. 1 with the augur as referred to in FIG. 5 as well as a discharge chute as mounted onto the housing.

For the combination device 1 to perform as a snow thrower, as shown in FIGS. 1 and 6, a snow augur 60 is shown in FIG. 5, the front portion of which a coupling element 61 can be seen via which the transmission axle 21 with its key elements 30 and 31 can be coupled in firm rotation. On the other end of the rotational axle 62, opposite to the coupling element 61, an insertion hole can be found but which is not shown here in FIG. 5. Further description on the snow augur 60 is deemed unnecessary as it conforms to the state-of-the-art.

Figure 7:
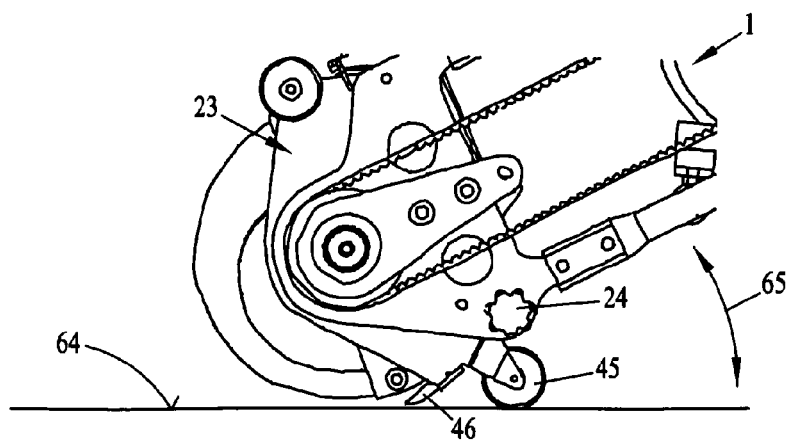
FIG. 7 a partial view VII of the snow thrower as implemented from the combination device in FIG. 6.

FIG. 6 shows the combination device 1 in its snow throwing configuration. It can be recognized that the housing 23 circumscribes the snow augur 60 partially, hence exposing the housing 23 forward in the travelling direction as indicated by the arrow 63 as well as backwards. The wheels 43 and 44 as described in FIG. 4 are functionally redundant in this operating state of the housing 23. On the contrary, the wheels 45, the configuration of which corresponds to those of the wheels 43 and 44, are mounted onto the housing 23 in order to support the combination device 1 on its front end. This can be seen in particular from the side view as shown in FIG. 7.

It is noticeable that the wheels 45 are being supported by the ground 64, hence defining through the same wheels 45 the vertical separation between the scraper 46 and the ground. By adjusting the height via the wheels 7 and 8 as shown in FIG. 6, a pivotal movement will be resulted in the direction as shown by the double arrow 65 (FIG. 7) with the whole combination device 1 pivoting about the rotating axis of wheels 45, thereby enabling the vertical separation between the scraper 46 and the ground 64 to become adjustable. In this respect, the snow throwing function can be optimally adapted by means of special features such as those located on the housing 23 together with the wheels 45. It can be seen further in FIG. 7 that the first operating configuration is fixed by means of the security bolt 24.

Apart from height adjustment via the wheels 7 and 8, other means of setting the separation between the scraper 46 and the ground 64 is also possible and easily achievable within certain limitation.

Figure 8:
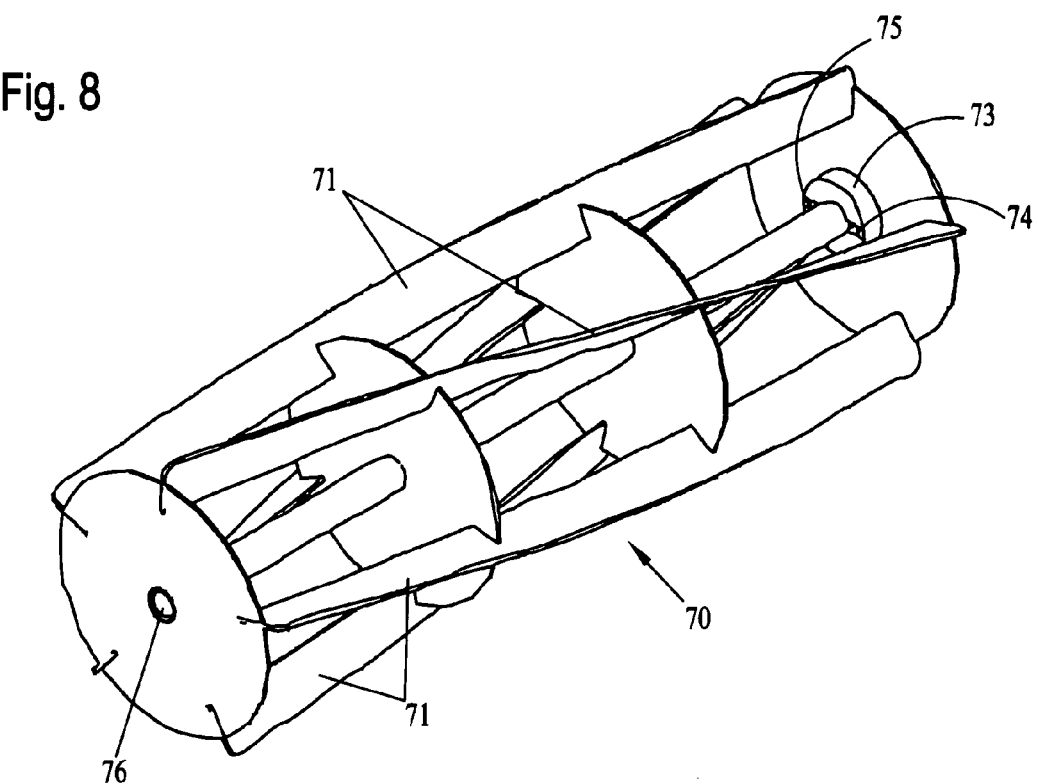
FIG. 8 is a perspective view of one work implement in the form of a mowing reel with the so called upper blades equally spaced along its circumference.
Figure 9:
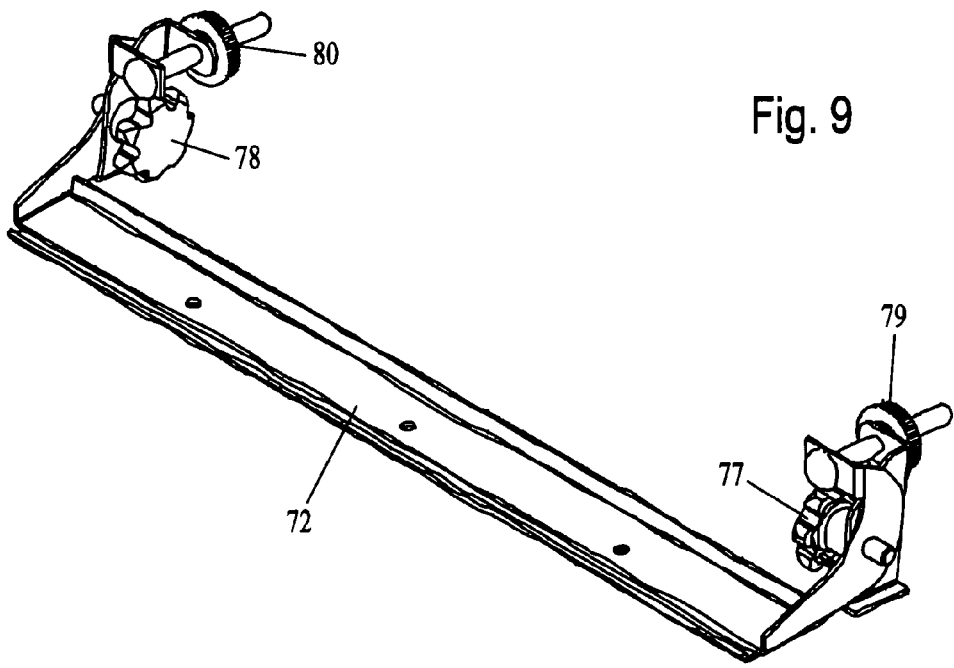
FIG. 9 is a perspective view of a so-called bed-knife which can be combined with the mowing reel in FIG. 8 of the combination device to become a lawn mower.

FIG. 8 shows a mowing reel 70, as is generally regarded as state-of-the-art. The mowing reel 70, as shown in FIG. 8, comprises a multiple of so-called upper blades 71 which act together with the so-called lower blade 72, as shown in FIG. 9, to perform the grass cutting function. It can also be seen in FIG. 8 at the right hand side of the reel cylinder that the coupling journal 73 is equipped with two radially projecting take up slots 74 and 75. With the slots 74 and 75, the mowing reel 70 can be attached to the transmission axle 21 in firm rotation via the drive element 29 as well as the two radially projecting key elements 30 and 31 (FIG. 2). On the opposite end of the mowing reel spindle 70, a fixation hole 76 is located, into which the gudgeoning pin 22 of the assembly side plate 12 in FIG. 2 can be inserted.

Figure 10:
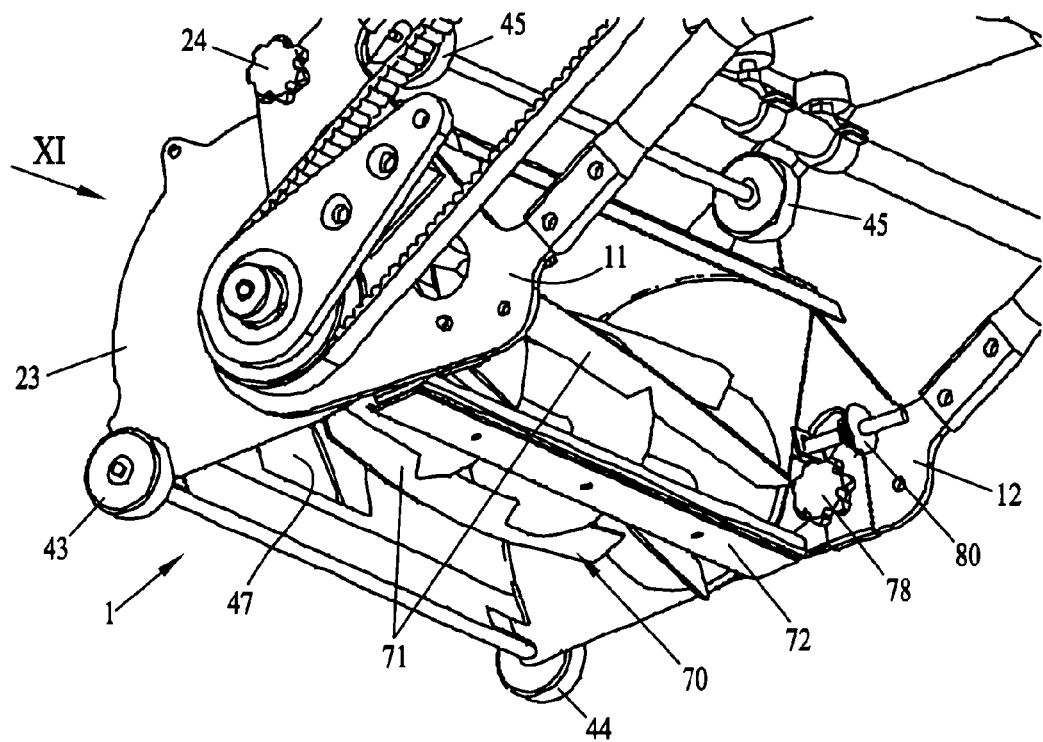
FIG. 10 is a perspective view of the combination device showing the housing with the attached mowing reel as well as the bed-knife.

The lower blade 72 has two side mounted bolts 77 and 78, with which the lower blade 72 can be mounted to the assembly side plates 11 and 12, as shown in FIG. 10 out of the bottom view of the combination device 1. The lower blade 72 can be adjusted in relation to the upper blades by means of two side adjustment screws 79 and 80, such that mowing can be adapted to various cut quality. It is also possible to have the mowing spindle 70 together with the lower blade combined into one module which can then be inserted into the housing 23 of the combination device 1.

Figure 11:
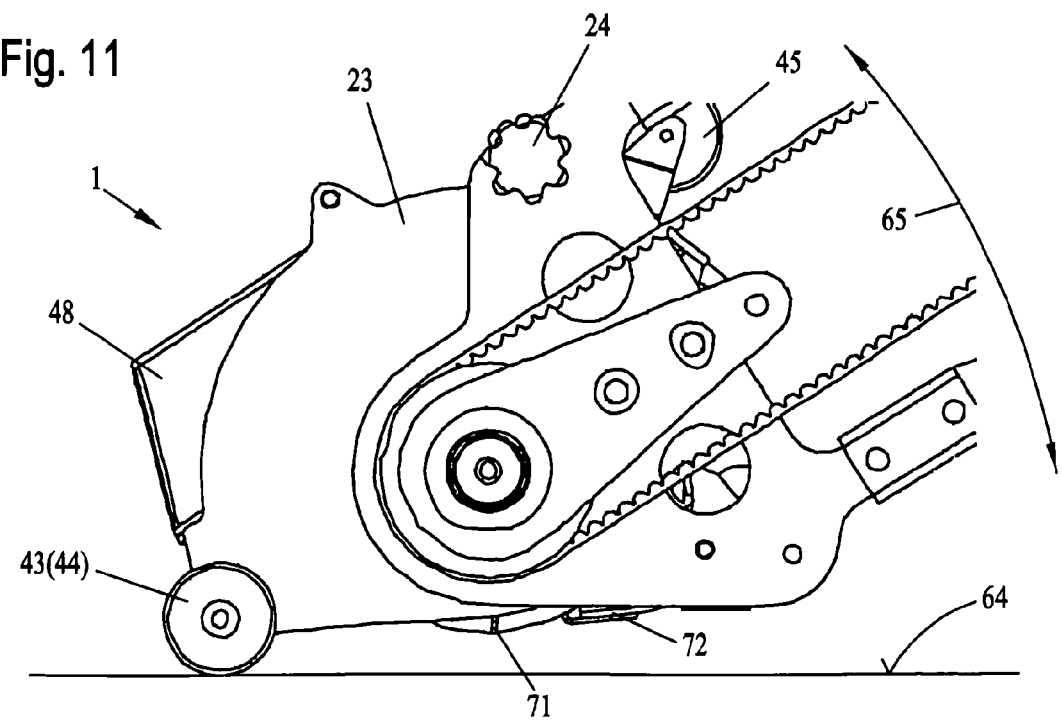
FIG. 11 a partial side view XI of the combination device as referred to in FIG. 10.

Referring to FIG. 10 and FIG. 11, the housing 23 is now set in its third operating configuration as that of a lawn mower. In this third configuration, both wheels 45 as shown in FIG. 10 are rendered functionally redundant. On the other hand, both the other wheels 43 and 44 are now in contact with the ground 64, such that the "frontal piece" of the whole combination device 1 is supported by the wheels 43 and 44. This results in a vertical separation as can be seen in FIG. 11, between the group of blades, comprising the upper blades 71 and the lower blade 72, and the ground 64.

In the third operating configuration, the housing 23 is firmly bolted down by means of the security bolts 24. The height adjustment is also made possible here via the wheels 7 and 8 that are attached onto the frame pillars 3 and 4, thereby producing a pivotal effect on the combination device 1 about the rotation axis of the wheels 43 and 44, the direction of which is as indicated by the double arrow 65. In this way, a height adjustment is also catered for in the mowing function by setting the distance between the blades, both upper blades 71 and lower blade 72, and the ground 64, so as to achieve the required cutting height.

In this configuration of the combination device 1, the snow throwing chute 49 in FIG. 6 is without saying no longer needed and will be dismantled accordingly. The opening 47 as shown in FIG. 10 which functions as the snow throwing chute adapter 48 as shown in FIG. 11 is preferably to be covered up by means of say a protection cover which is not shown here in the drawing.

Referring to FIG. 10, a basket for grass collection, which is not shown here, can be placed behind the housing 23. The basket can also serve as a protection device for the user who drives behind the combination device 1. Such a basket can also be adapted for the scarifying, tilling or sweeping functions.

Figure 12:
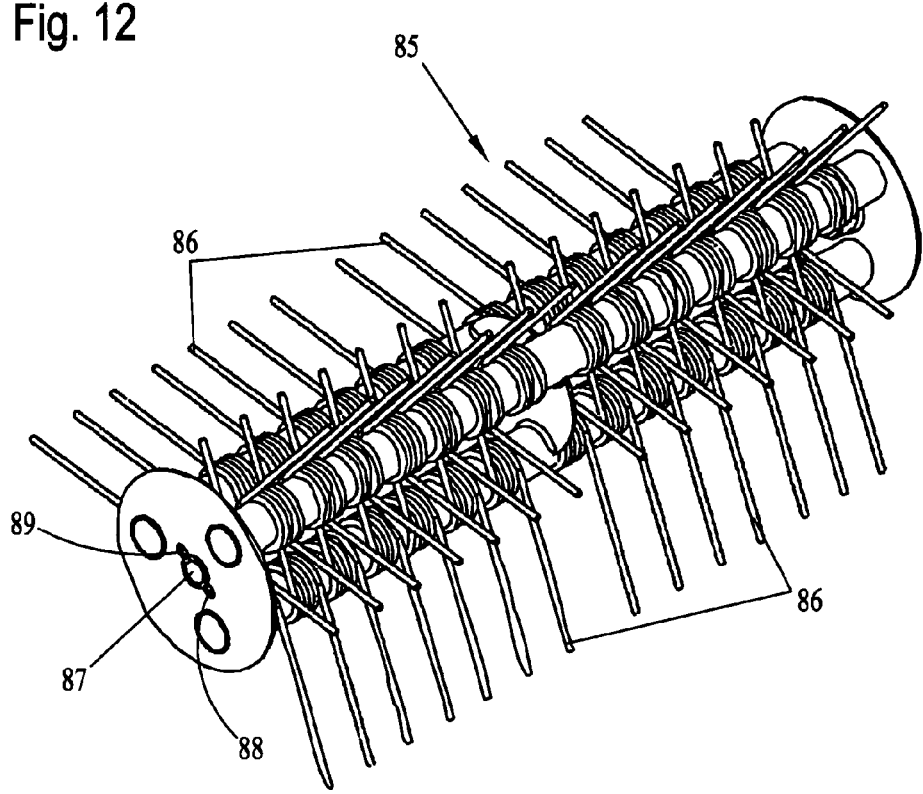
FIG. 12 is a perspective view of a work implement in the form of a scarifying cylinder with spring tines radiating substantially outwards.
Figure 13:
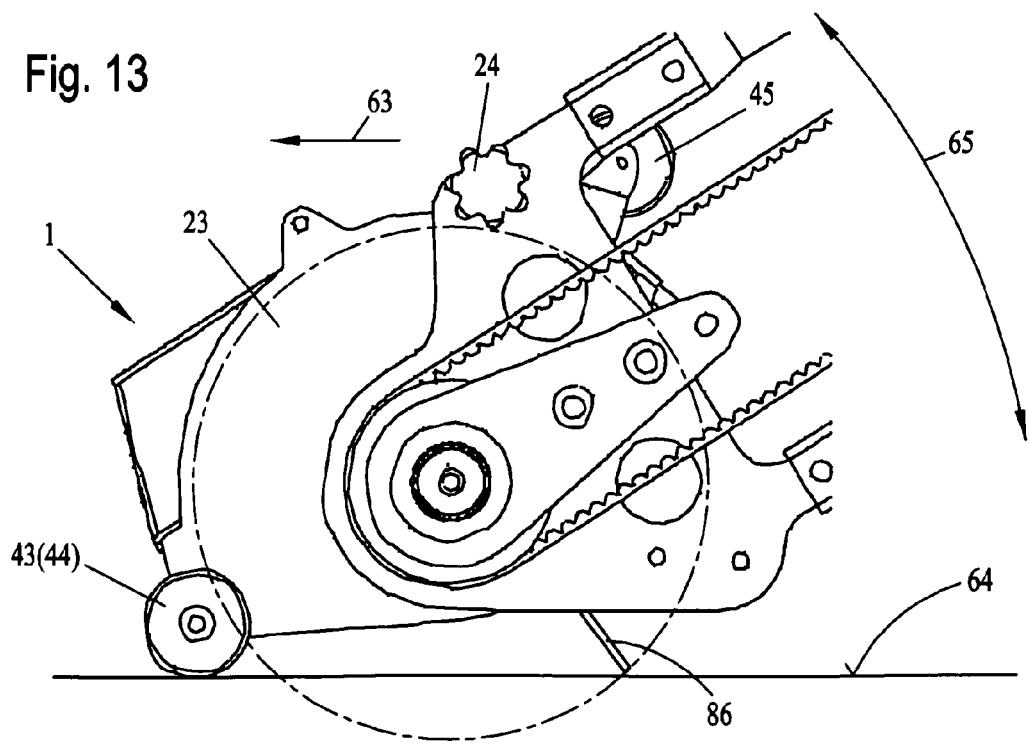
FIG. 13 a partial side view of the combination device with the attachment of the scarifying cylinder as referred to in FIG. 12.

FIGS. 12 and 13 show another function of the combination device 1, whereby FIG. 12 shows the work implement in the form of a scarifying cylinder 85. This scarifying cylinder 85 comprises a multitude of spring tines 86 that radiate out of the rotational axis and serve as means of aerating the soil in the lawn. The scarifying cylinder 85 in the presented form or in form equipped with radial airing blades is state-of-the-art and whose examples are plentiful.

In FIG. 12, the scarifying tool 85 is shown with an adapter at its end and two radial slots 88 and 89, with which the scarifying tool 85 can be coupled in firm rotation to the drive element 29 of the transmission axle 21 via the two drive keys 30 and 31 (see FIG. 2).

FIG. 13 shows the configuration of the combination device 1 as scarifier. It can be noticed that the housing 23 is set up in the same third operating configuration as when the combination device 1 is used as mower, as shown particularly in FIG. 11. Accordingly the operating configuration is fixed in position by means of the security bolts 24, whereby the wheels 45 are also made redundant here. The housing 23 is supported off the ground 64 by the wheels 43 and 44 in such a way that the penetrating depth of the spring tines 86 can be adjustably defined. Through the height adjustment of wheels 7 and 8 at both the frame pillars 3 and 4 (FIG. 1), the whole combination device 1 can thus be seen pivoting about the bearing axis of the wheels 43 and 44 in direction as indicated by the double arrow 65 such that the penetrating depth of the spring tines 86 can also be adjusted.

The combination device can be easily set up to function as scarifier. The housing 23 is there, as can clearly be recognized in FIG. 13, opening itself up from beneath and towards the rear against the direction of travel as indicated by the arrow 23.

Figure 14:
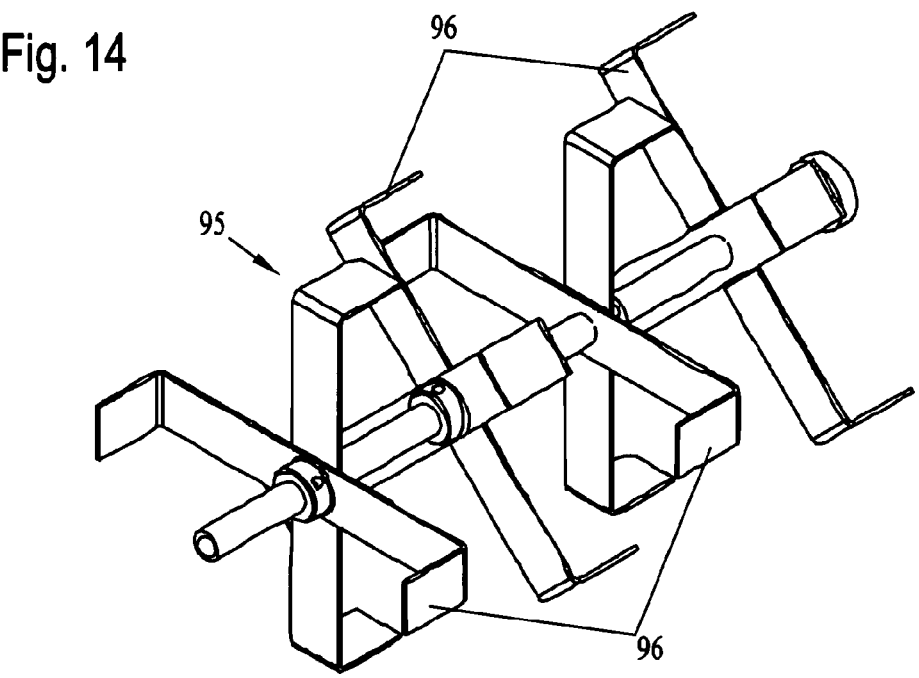
FIG. 14 is a perspective view of a work implement in the form of a tilling cylinder in perspective view.

In yet another implement, the combination device 1 can be used as a tiller. To this, a work implement typically in the form of a tilling cylinder 95 can be seen in FIG. 14. The tilling cylinder 95, as is general known as the state-of-the-art, comprises the so-called cleavers which are used for ground breaking and soil loosening.

Figure 15:
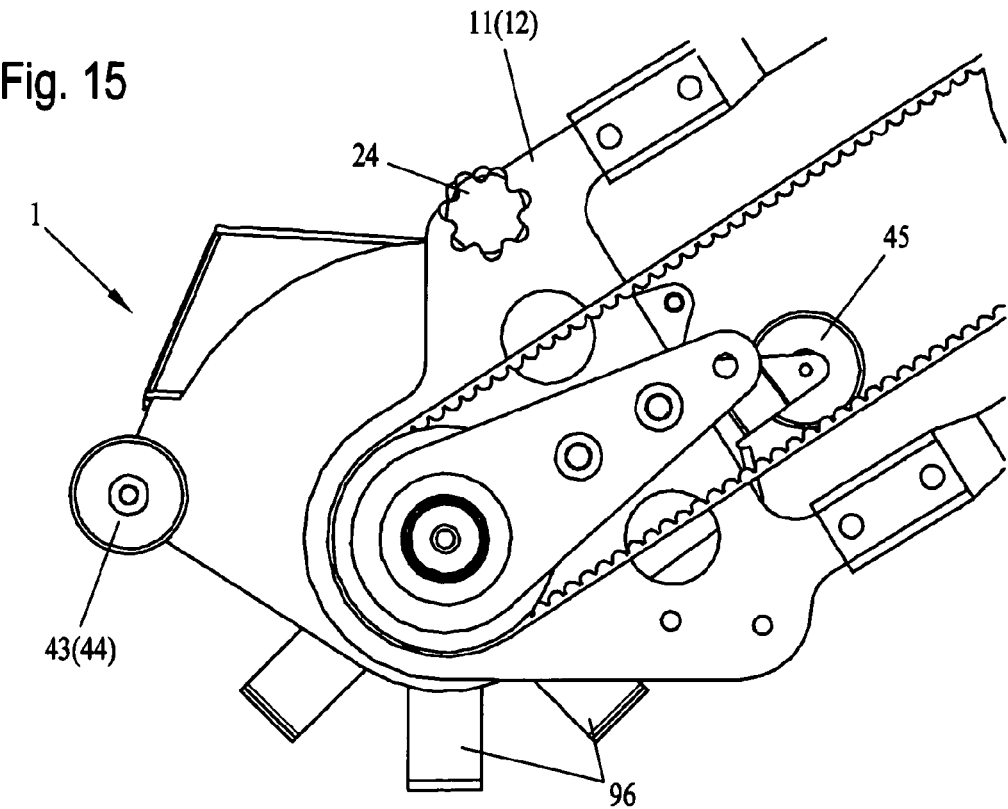
FIG. 15 is a partial side view of the combination device with the attachment of the tilling cylinder as referred to in FIG. 14.

FIG. 15 shows part of the side view of the combination device 1, onto which the tilling cylinder 95 with its cleavers 96 is mounted. It can be seen that under this condition, the runners 45 as well as the runners 43 are made functionally redundant. This means that the housing 23 is fixed in its second operating configuration, and in this case bolted down to the assembly side plates 11 and 12 by the security bolts 24. On account of this arrangement, the cleavers 96 project well beneath the housing 23 such that a reasonable soil depth penetration can be achieved here. By controlling the handgrips 5 and 6 of the combination device 1, an optimal soil loosening is made possible.

Instead of the exemplary work implements presented here so far, other cylindrical work implements such as a sweep roller can also be deployed. Through the respective turning of the housing 23, such a sweep roller in the desired form can be hidden either towards the rear or partially towards the front, so that the combination device 1 can easily be converted into a sweeping machine. If the sweep roller is hidden by the housing 23 towards the front, then a sweep collector can be placed towards the rear for catching all the swept material. In this embodiment, the reversal of the direction of rotation will not be necessary as far as the sweeping function of the combination device 1 is concerned.

In particular, with regards to the height adjustment for the respective work implements or their distance of separation relative to ground, the first and second configurations provide simple means of adjustment, such that the sweeping function and its effectiveness can also be height adapted by means of adjusting the wheels 7 and 8. Also in this configuration, provision for a sweep collector is possible such that the direction of rotation will not need to be reversed and that extra protection to the user being hit by the swept material can also be provided. It is also possible to have a sweeper rolling against the direction of travel such that the ground material is always swept to the front. In this case, a sweep collector will not be necessary. In the case of such reverse transmission, the housing 23 is best recommended to adopt the snow throwing configuration i.e. facing front and open at the bottom as in the first operating configuration.

It can also be noticed that in particular through the turning of the housing 23, every function of the combination device 1 can be optimally adapted to the corresponding task in question. The changing of work implements is enormously simplified through the special design of the transmission axle 21 on the one hand, and the gudgeoning pin 22 on the other, such that by their being pulled out, the tool implements can be inserted into the combination device 1 or the housing 23. Tool changing takes place when the housing 23 is in its first operating configuration, as shown typically in FIG. 1.

Also it can be imagined that the front part of the combination device 1 with its assembly side plates 11 and 12 as well as the housing 23 can be used as a tool attachment for say a communal service vehicle. The simple retooling and the optimal setting up through the rotatable housing can also be advantageous.

While specific embodiments of the invention have been described in detail to illustrate the application of the principles of the invention, it will be understood that the invention may be embodied otherwise without departing from such principles.

The invention claimed is:

1. A combination device for at least one of snow throwing, mowing, scarifying, tilling and sweeping, the combination device comprising:
   a first work implement;
   a second work implement;
   a base frame; and
   a housing comprising a housing axis of rotation, said housing being mounted for movement to said base frame such that said housing rotates about said housing axis of rotation, relative to said base frame, between at least a first position and at least a second position, said housing defining a first housing configuration in said first position, said housing defining a second housing configuration in said second position, said housing being fixed in said first housing configuration with said first work implement detachably connected to said housing, wherein said first work implement is rotatable about a first work implement axis of rotation thereof with said housing in said first housing configuration, said first work implement being at least partially enclosed by said housing with said housing in said first housing configuration, said second work implement not being connected to said housing with said housing in said first housing configuration, said housing being fixed in said second housing configuration with said second work implement detachably connected to said housing, wherein said second work implement is rotatable about a second work implement axis of rotation thereof with said housing in said second housing configuration, said second work implement being at least partially enclosed by said housing with said housing in said second housing configuration, said housing axis being parallel to said first work implement axis of rotation and said second work implement axis of rotation.

2. A combination device in accordance with claim 1, further comprising:
   a third work implement, wherein said housing rotates from said second position to a third position, said third position defining a third housing configuration, said housing being fixed in said third housing configuration with said third work implement detachably connected to said housing, wherein said third work implement is rotatable about a third work implement axis of rotation thereof with said housing in said third housing configuration, said third work implement being at least partially enclosed by said housing with said housing in said third housing configuration, said first work implement and said second work implement not being connected to said housing with said housing in said third housing configuration.

3. A combination device according to claim 2, wherein the housing encloses a mounted one of said work implements over a wrap angle, the extent of which is chosen in such a way that the housing in the first housing configuration is substantially open towards the front and bottom, in the second housing configuration is substantially open towards the bottom and in the third housing configuration is substantially open toward the rear and bottom.

4. A combination device according to claim 3, further comprising a scraper wherein the housing is attached with the scraper in the region along the rear edge, the scraper for picking up snow during snow throwing, and the housing, in the first housing configuration, exhibiting an opening on the top wall that serves as an adapter for a snow throwing chute.

5. A combination device according to claim 3, further comprising roller or runners wherein the housing is mounted with the rollers or runners along front and back edges both of which running parallel to the rotational axis of the mounted one of the work implements, and the housing is supported on a rear set of the rollers or runners above ground in the first housing configuration, and the housing is not supported by any of the rollers or runners above ground in the second housing configuration, and the housing is supported on a front set of the rollers or runners above ground in the third housing configuration.

6. A combination device according to claim 3, wherein one of said first work implement and said second work implement comprises a cylindrical set of upper blades of a mowing spindle which interacts with a lower blade stationed at the periphery of the rotating cylindrical blades to provide the lawn mowing function, and the housing is set up in the third housing configuration.

7. A combination device according to claim 6, wherein the mowing spindle and the lower blade can be grouped into one single module, which then can be inserted into the combination device.

8. A combination device according to claim 3, wherein one of the first work implement and the second work implement comprises a cylindrical set of cleavers that form the tilling drum and the housing is set at the second housing configuration, or one of the first work implement and the second work implement comprises an augur for the purpose of snow throwing and the housing is set at the first housing configuration.

9. A combination device according to claim 2, wherein the work implement comprises a cylindrical set of spring tines that form a scarifier drum and the housing is set at the third housing configuration, or the work implement comprises a cylindrical set of brush elements that form a sweeping roller wherein the housing is set at one of said first housing configuration, said second housing configuration and said third housing configuration.

10. A combination device in accordance with claim 2, wherein said housing comprises a plurality of first rollers or roll cylinders and a plurality of second rollers or roll cylinders, said first rollers or roll cylinders being connected to a front portion of said housing, said second rollers or roll cylinders being connected to a rear portion of said housing, said second rollers or roll cylinders being in contact with a ground surface in said first housing configuration, said first rollers or roll cylinders and said second rollers or roll cylinders not being in contact with the ground surface in said second housing configuration, said first rollers or roll cylinders being in contact with the ground surface in said third housing configuration.

11. A combination device for at least one of snow throwing, mowing, scarifying, tilling and sweeping, the combination device comprising:

a plurality of work implements;
a base frame; and
a housing comprising a housing axis of rotation, said housing being mounted for movement to said base frame such that said housing rotates about said housing axis of rotation between at least a first position and at least a second position with respect to said base frame, said housing defining a first housing configuration in said first position, said housing defining a second housing configuration in said second position, said housing being fixed at one of said first position and said second position based on a type of one of said work implements, wherein only one of said work implements is detachably connected to said housing with said housing in said first housing configuration such that said one of said work implements is rotatable about one axis of rotation, wherein only another one of said work implements is detachably connected to said housing with said housing in said second housing configuration such that said another one of said work implements is rotatable about another axis of rotation, said housing axis of rotation being parallel to said one axis of rotation and said another axis of rotation, wherein said housing comprises a plurality of first rollers and a plurality of second rollers, said first rollers being connected to a front portion of said housing, said second rollers being connected to a rear portion of said housing, said second rollers being in contact with a ground surface in said first housing configuration, said first rollers and said second rollers not being in contact with the ground surface in said second housing configuration.

12. A combination device in accordance with claim 11, wherein said plurality of work implements comprise yet another work implement, wherein said housing rotates from said second position to a third position, said third position defining a third housing configuration, said first rollers being in contact with the ground surface in said third housing configuration, wherein only said yet another work implement is detachably connected to said housing with said housing in said third position.

* * * * *